United States Patent
Lisso (10) Patent No.: US 11,440,195 B2
(45) Date of Patent: Sep. 13, 2022

(54) AUTONOMOUS CARGO LOADING SYSTEMS AND METHODS

(71) Applicant: Target Brands, Inc., Minneapolis, MN (US)

(72) Inventor: Gregory Lisso, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 448 days.

(21) Appl. No.: 16/519,206

(22) Filed: Jul. 23, 2019

(65) Prior Publication Data

US 2020/0030985 A1 Jan. 30, 2020

Related U.S. Application Data (60) Provisional application No. 62/703,052, filed on Jul. 25, 2018.

(51) Int. Cl.
*B25J 9/16* (2006.01)
*B25J 5/02* (2006.01)
(Continued)

(52) U.S. Cl.
CPC ............... *B25J 9/1697* (2013.01); *B25J 5/02* (2013.01); *B25J 9/1661* (2013.01); *B25J 9/1669* (2013.01);
(Continued)

(58) Field of Classification Search
CPC . B25J 5/02; B25J 9/1697; B25J 9/1612; B25J 9/1669; B25J 9/1661; B65G 1/1375;
(Continued)

(56) References Cited

U.S. PATENT DOCUMENTS 9,089,969 B1 7/2015 Theobald
9,457,970 B1 * 10/2016 Zevenbergen ......... B65G 15/22
(Continued)

FOREIGN PATENT DOCUMENTS

CN 103395638 A * 11/2013 ............. B65G 67/10
WO WO-2018050990 A1 * 3/2018 ............... B07C 5/38

OTHER PUBLICATIONS

Bastian Solutions [online], "New Concepts—Robotic Trailer Loading," Jul. 6, 2011, [retrieved on Nov. 16, 2021], retrieved from: URL <https://www.youtube.com/watch?v=H-Hw-9uoE_s>, 1 page(Video Submission) (Year: 2011).*
(Continued)

*Primary Examiner* — Khoi H Tran
*Assistant Examiner* — Tanner L Cullen
(74) *Attorney, Agent, or Firm* — Fish & Richardson P.C.

(57) ABSTRACT

Robotic automation and methods described herein can be used to enhance the efficiencies of freight shipping processes. For example, this document describes the use of automated systems and methods for densely loading cargo into freight carriers (e.g., semi-trailers) in an efficient manner. Some such systems can include one or more movable robots that can travel along an open side or open top of a semi-trailer to autonomously load parcels into the trailer in a densely packed manner. The disclosed systems and methods allow for the reduction or elimination of manual labor for loading shipping trailers in a very dense manner.

14 Claims, 5 Drawing Sheets

(51) Int. Cl.
*B65G 1/137* (2006.01)
*G06Q 10/08* (2012.01)
*B25J 9/00* (2006.01)
*B65G 67/04* (2006.01)

(52) U.S. Cl.
CPC ....... B65G 1/1375 (2013.01); G06Q 10/0832 (2013.01); G05B 2219/40006 (2013.01)

(58) Field of Classification Search
CPC ........ B65G 61/00; B65G 67/04; B65G 57/03; B65G 2201/047; B65G 57/00; B65G 2811/0605; B65G 2811/061; G05B 2219/40006; G06Q 10/0832
See application file for complete search history.

(56) References Cited

U.S. PATENT DOCUMENTS

| | | |
|---|---|---|
| 9,688,489 B1 | 6/2017 | Zevenbergen et al. |
| 9,864,911 B1 | 1/2018 | Curlander et al. |
| 2005/0125101 A1* | 6/2005 | Brust .................... B07C 5/10 700/245 |
| 2007/0160449 A1* | 7/2007 | Girn ..................... B65G 67/02 414/390 |
| 2016/0068357 A1* | 3/2016 | Bastian, II ........... B65G 67/20 414/392 |
| 2017/0107056 A1* | 4/2017 | Kadaba ................ G06Q 50/28 |
| 2017/0190054 A1* | 7/2017 | McCollum .......... B25J 15/0616 |
| 2017/0190510 A1* | 7/2017 | Porat ...................... B64F 1/32 |
| 2017/0369259 A1* | 12/2017 | Criswell .............. B65G 21/14 |
| 2018/0093828 A1 | 4/2018 | Lindbo et al. |
| 2018/0155029 A1* | 6/2018 | Gil ........................ H04W 4/70 |
| 2018/0155142 A1* | 6/2018 | Worsley ............... B25J 9/0078 |
| 2018/0194575 A1* | 7/2018 | Anderson ............. B65G 67/02 |

OTHER PUBLICATIONS

Bastian Solutions [online], "New Concepts—Robotic Trailer Loading," Jul. 6, 2011, [retrieved on Jul. 22, 2019], retrieved from: URL <https://www.youtube.com/watch?v=H-Hw-9uoE_s>, 1 page (Video Submission).

* cited by examiner

AUTONOMOUS CARGO LOADING SYSTEMS AND METHODS

CROSS-REFERENCE TO RELATED APPLICATIONS

This application claims the benefit of U.S. Provisional Application Ser. No. 62/703,052, filed Jul. 25, 2018. The disclosure of the prior application is considered part of (and is incorporated by reference in) the disclosure of this application.

BACKGROUND

Supply chain freight costs are highly dependent upon effective utilization of the available volume in the cargo carrier (e.g., a semi-trailer). Freight can be loaded into the cargo area of semi-trailers in various manners, including on pallets, in containers, or directly onto the trailer floor. Directly loading to the trailer floor is often referred to as "fluid loading." This method is generally accepted as the best for optimizing cube utilization and for providing the lowest freight cost. Most large parcel handlers use this method extensively or almost exclusively.

Because fluid loading does not utilize a bundling or carriage device (such as pallet or slip sheet) extensive manual labor is required. Humans are almost exclusively used to "build a wall" of cargo in each trailer. This is traditionally accomplished by putting personnel in the trailer to stack freight, from the floor to the ceiling, beginning in the nose of the trailer and working backwards, until the trailer is full.

The labor cost to manually "build a wall" of cargo in a trailer is extensive. Moreover, the working conditions (e.g., hot/cold conditions inside of a trailer) and ergonomics required (e.g., lifting, bending, stooping) are generally poor. Despite such negative aspects, humans are generally used for this task because they have a unique pattern problem solving skill that allows for near perfect stacking of various package sizes in an interlocking pattern that is dense and relatively stable.

SUMMARY

This document describes systems and methods for enhancing the efficiencies of freight shipping processes. For example, this document describes automated systems and methods for densely loading cargo into freight carriers (e.g., semi-trailers) in an efficient manner.

In one aspect, this disclosure is directed to a robotic system for loading parcels into a freight carrier. In some embodiments, the system includes: (i) a robotic actuator; (ii) an end effector attached to the robotic actuator and adapted for releasably coupling with individual parcels; (iii) a rail to which the robotic actuator is movably coupled so that the robotic actuator is movable along an open top or open side of the freight carrier; and (iv) a control system in communication with the robotic actuator. The control system is configured and operable to determine locations within the freight carrier that each of the parcels should be positioned based on: (i) size dimensions of the individual parcels and (ii) an open cargo space of the freight carrier. The control system is also configured and operable to send control commands to the robotic actuator to position each of the parcels at the respective determined locations of each of the parcels.

Such a robotic system for loading parcels into a freight carrier may optionally include one or more of the following features. The control system may be configured and operable to determine an updated open cargo space of the freight carrier as each of the parcels is individually positioned in the open cargo space of the freight carrier. The system may also include a conveyor positioned along the rail, the conveyor configured to convey the parcels to the robotic actuator. The robotic actuator may include a vision system, and the end effector may be oriented to couple with the individual parcels using the vision system. The robotic actuator may include a measurement system by which the robotic actuator can measure a cargo space of the freight carrier and become oriented in relation to the cargo space of the freight carrier. The robotic actuator may be suspended from and below the rail. The robotic actuator may be supported on and above the rail. The system may also include a second robotic actuator movably coupled to the rail. The system may also include a second rail and a second robotic actuator movably coupled to the second rail.

In another aspect, this disclosure is directed to a method for robotically loading parcels into a freight carrier. In some embodiments, the method includes: (a) controlling a robotic system to obtain a physical orientation of the robotic actuator in relation to a cargo space of the freight carrier; (b) receiving respective size dimensions of each parcel to be loaded into the freight carrier; (c) determining respective positions within the freight carrier for each of the parcels based on: (i) the respective size dimensions of each parcel and (ii) an open cargo space of the freight carrier; and (d) controlling the robotic system to physically position each of the parcels in the determined respective locations within the freight carrier, wherein the open cargo space is determined after each parcel is positioned within the freight carrier.

Such a method for robotically loading parcels into a freight carrier may optionally include one or more of the following features. The parcels may be positioned by the robotic system on the floor of the cargo space of the freight carrier first and then upward on top of previously positioned parcels. A vision system may be used to assist the robotic system to pick up each of the parcels. The step of determining respective positions within the freight carrier for each of the parcels may be performed on a one parcel at a time basis. The step of determining respective positions within the freight carrier for each of the parcels may be performed on batch of parcels basis. The step of determining respective positions within the freight carrier for each of the parcels may be performed on an entire load basis.

The systems and processes described here may be used to provide one or more of the following optional benefits. First, labor costs associated with cargo transportation and order fulfillment processes overall may be reduced using the automated systems and processes described herein. For example, the systems and processes described herein can function essentially autonomously, thereby reducing or eliminating the need for human involvement in the process of densely loading cargo into freight carriers. Second, automation systems described herein can be used to perform tasks that are currently at least somewhat hazardous and/or uncomfortable for human workers. Accordingly, worker injuries may be advantageously reduced, and/or working conditions may be made more comfortable for humans. Third, the systems and processes described herein can facilitate the loading of cargo into freight carriers in a dense manner. Accordingly, transportation costs can be reduced in comparison to some current methods. Fourth, utilization of powerful computerized algorithms and robotic placement of preselected destinations can result in greater density than human loading of freight in a FIFO (First in First Out) manner. Fifth, cycle time for loading of the cargo container can be shortened as the automation systems can work faster than the number of human workers that can practically work in a shipping container.

Other features, aspects and potential advantages will be apparent from the accompanying description and figures.

DESCRIPTION OF DRAWINGS

Like reference symbols in the various drawings indicate like elements

DETAILED DESCRIPTION

This document describes systems and methods for enhancing the efficiencies of freight shipping processes. For example, this document describes automated systems and methods for densely loading cargo into freight carriers (e.g., semi-truck trailers) in an efficient manner. Said another way, this document describes systems that include one or more movable robots that can travel along an open side or open top of a semi-trailer to autonomously load parcels into the trailer in a densely packed manner. This method allows for the reduction or elimination of manual labor for loading shipping trailers in a very dense, pallet-less manner.

Figure 1:
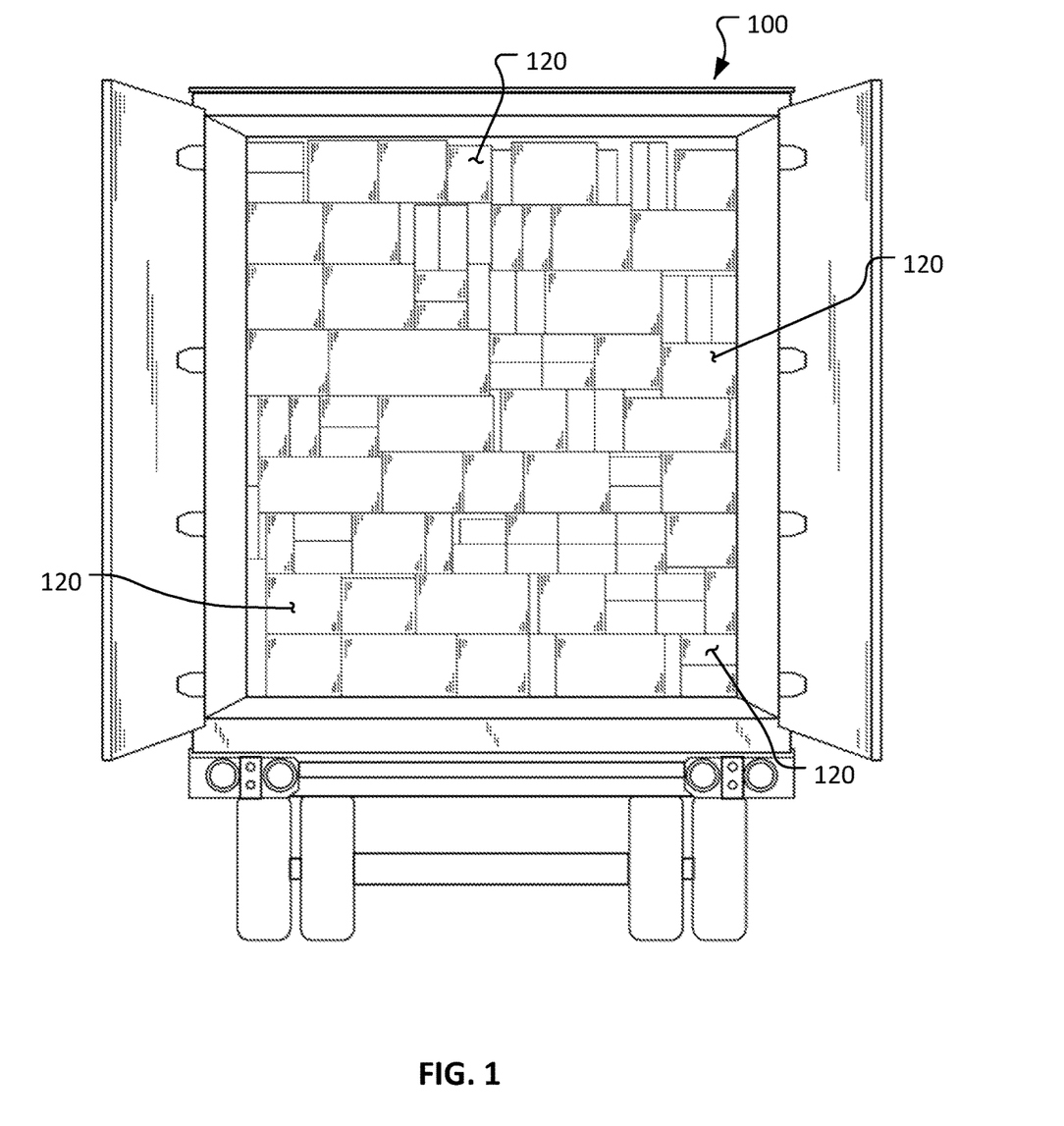
FIG. 1 illustrates an interior of a semi-trailer in which boxes are densely packed in a wall-like fashion.

FIG. 1 depicts a rear view of an example semi-trailer 100 that has been loaded with multiple parcels 120 of various sizes in a very dense arrangement. Such a dense arrangement is desirable in order to maximize the utilization of the space of the semi-trailer 100, and to reduce transportation costs accordingly.

Conventionally, such a densely packed arrangement, as depicted, is accomplished using one or more human workers who mentally assess the size of each of the parcels 120 and determine a position in which each of the parcels 120 can be tightly fit (sort of like a puzzle). Traditionally, humans are used for this task because they have a unique pattern problem solving skill that allows for near perfect stacking of various package sizes in an interlocking pattern that is dense and relatively stable. This allows filling from the front end of the cargo area of the semi-trailer 100 (or other type of freight carrier) to the back end without the parcels 120 falling or "cascading" during the loading process.

As explained further below, this disclosure describes automated systems and methods for densely loading the parcels 120 into the semi-trailer 100 (e.g., as depicted in FIG. 1) in a manner that is far more efficient than that of using human manual labor.

Figure 2:
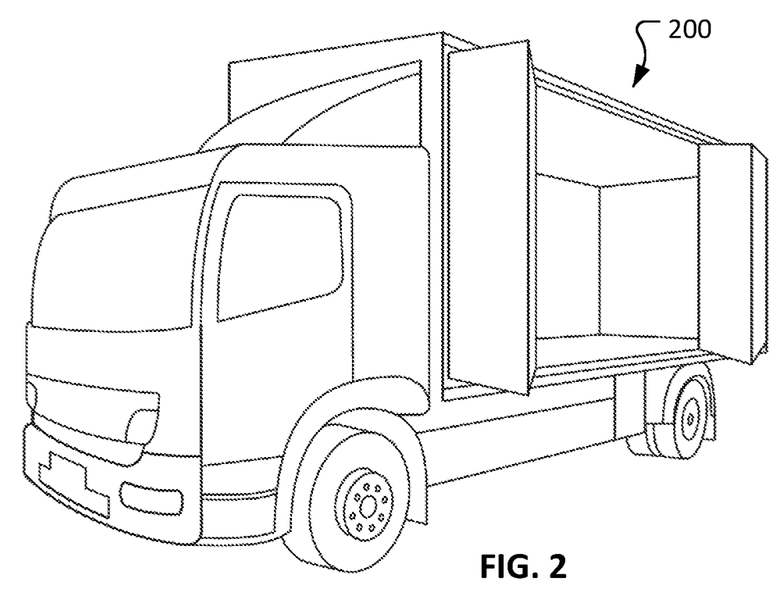
FIG. 2 is a perspective view of an example shipping truck with a cargo area that is configured to be accessible along the side of the truck.

Referring to FIG. 2, some types of freight carriers, such as the example box truck 200, are advantageously configured to be accessed along the side, rather than only at the rear end. Various other types of freight carriers can be similarly configured to be accessed along the side (e.g., semi-trailers, train cars, shipping containers, shipping vessels, etc.). It should be understood that the concepts described herein can be implemented in the contexts of any and all types of freight carriers.

In the depicted example, the truck 200 includes two bi-fold doors that open horizontally. Accordingly, the cargo area of the truck 200 can be accessed along the side, as described further below. Other types of side-access arrangements are also essentially analogous, such as, but not limited to, hinged doors that open vertically and flexible sides made of materials such as vinyl or canvass that can be rolled or gathered like an accordion (either vertically or horizontally).

Figure 3:
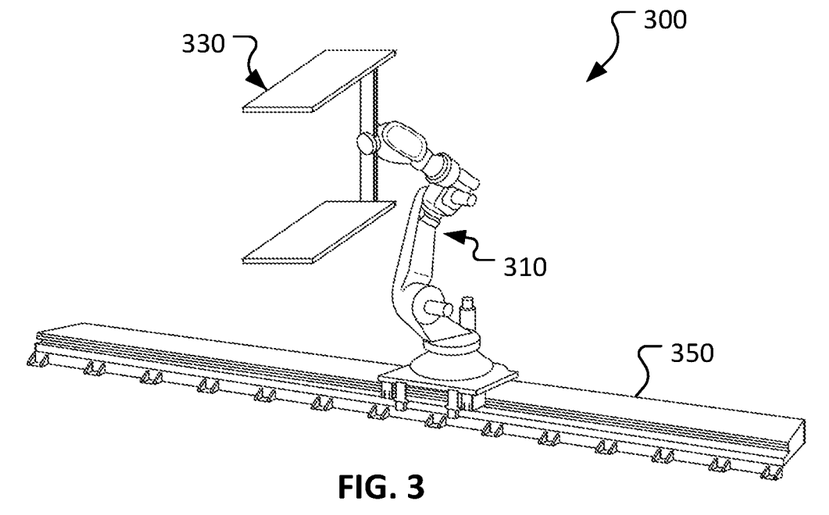
FIG. 3 is a perspective view of an example rail-mounted robot that can be used to autonomously load cargo into shipping containers in accordance with some embodiments described herein.

Referring also to FIG. 3, an example robotic system 300 can be used to load parcels into the truck 200. It should be understood that the depicted robotic system 300 is merely one non-limiting example of a type of robotic system that can be used as described herein.

The robotic system 300 broadly includes a robotic actuator 310, an end effector 330, and a rail 350. The end effector 330 is attached to the robotic actuator 310 so that the robotic actuator 310 can manipulate the positioning and orientation of the end effector 330. The robotic actuator 310 is movably coupled to the rail 350. Accordingly, the robotic actuator 310 (and attached end effector 330) can travel along the rail 350 and stop at any position along the rail 350. In some embodiments, the robotic system 300 also includes a vision system coupled to the robotic actuator 310. Such a vision system can be used for various purposes as described further below. In some embodiments, the robotic system 300 includes a measurement system, such as a laser measurement system that can be used as described further below.

The robotic actuator 310 can have various configurations. In some embodiments, the robotic actuator 310 includes two or more links that are joined by revolute joints and/or prismatic joints. Accordingly, the robotic actuator 310 can exhibit multiple degrees of freedom, and in some cases redundant degrees of freedom. In some embodiments, one or more of the links of the robotic actuator 310 are telescopic. It should be understood that the robotic actuator 310 is highly flexible in that it can be programmed and/or controlled to move and otherwise operate in any desired manner in accordance with principles generally known in the field of robotics.

The end effector 330 is primarily used by the robotic system 300 to pick up, transport, and place parcels/packages in a desired position within the cargo area of the truck 200. In some embodiments, the end effector 330 includes movable clamp arms (as depicted), suction cups, forks, and the like, and combinations thereof.

In the depicted embodiment, the robotic actuator 310 is movably mounted to the rail 350. Accordingly, a control system in communication with the robotic system 300 can adjust the position of the robotic actuator 310 along the rail 350. The rail 350 may be linear, curved, or a combination of both. In some embodiments, the robotic actuator 310 includes wheels that can move the robotic actuator 310 along a floor surface, thereby eliminating the need for the rail 350. As described further below, to improve cycle time, multiple rails 350 and multiple robots 310 can be utilized for loading a single shipping container.

Figure 4:
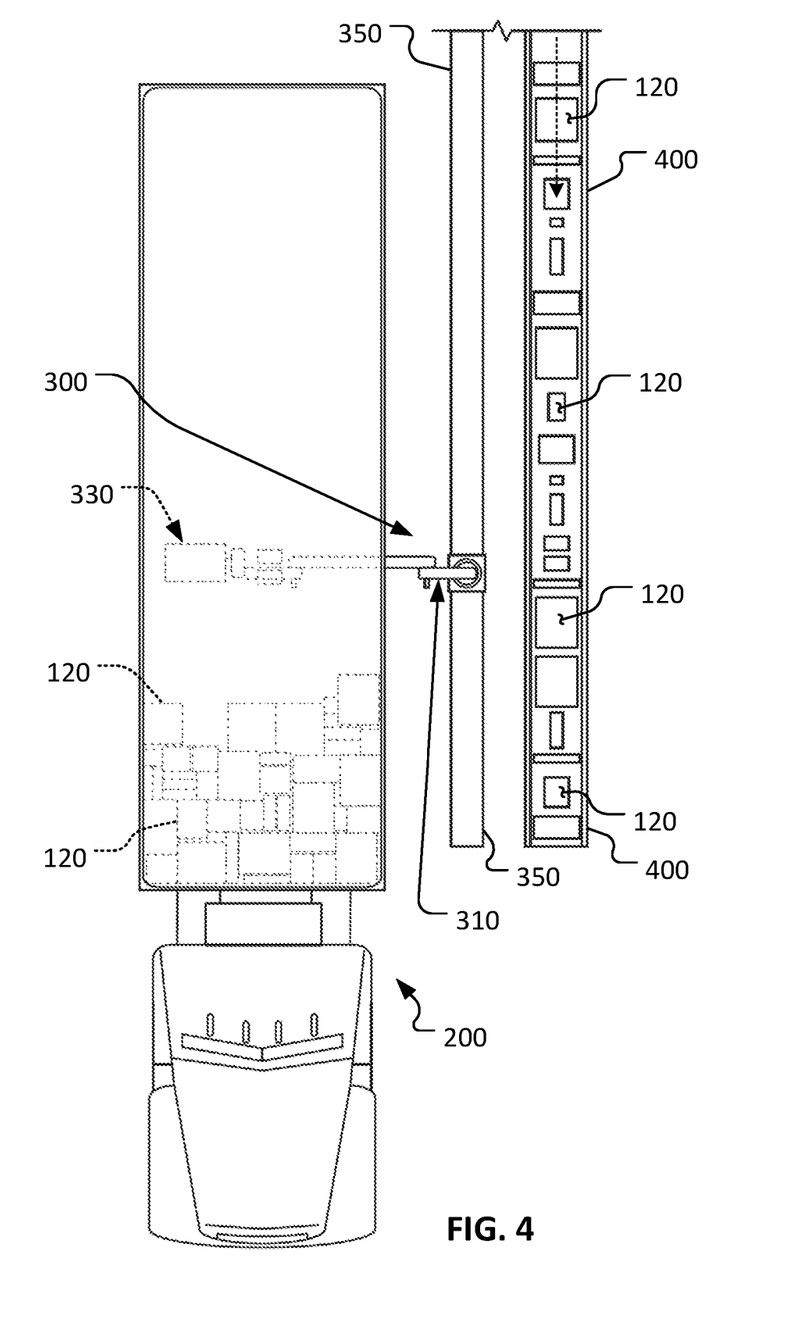
FIG. 4 is a plan view of an example system for autonomously loading cargo into a side-accessible semi-trailer in accordance with some embodiments described herein.

Referring also to FIG. 4, as depicted in a plan view, the robotic system 300 can be used to autonomously load the side-accessible truck 200 with parcels 120 in an efficient densely packed arrangement. In this example, a layer or level of the parcels 120 are first arranged on the floor of the cargo area of the truck 200, and then additional layers or levels of parcels 120 are added. In other words, the cargo area of the truck 200 becomes packed with parcels 120 by the robotic system 300 starting from the floor level and then building upward. It should be understood that the parcels 120 represent any type of item and packaging such as, but not limited to, boxes, totes, containers, carts, barrels, shrink-wrapped items, and the like, and combinations thereof.

In the depicted embodiment, the parcels 120 are being presented to the robotic system 300 via a conveyor 400 that extends generally along at least a portion of the rail 350 on which the robotic actuator 310 translates. The conveyor 400 (which can be any type of conveyor such as an accumulation conveyor, a belt conveyor, etc.), is loaded with the parcels 120 using any type of process including, but not limited to, manually, from an automated sortation system, robotically, using mobile robots, and the like, and combinations thereof. In some embodiments, the conveyor 400 can be replaced or supplemented by other ways of presenting parcels 120 to the robotic system 300 (e.g., by mobile robots, manual movement to a staging area, and the like).

In order to densely pack the parcels 120 in the truck 200, the robotic actuator 310 picks up the parcels 120 (e.g., one at a time) from the conveyor 400 using the end effector 330, pivots around to reach into the cargo area of the truck 200, and then sets the parcel 120 in a position which closely matches the size/volume of the parcel 120. The robotic actuator 310 travels along the rail 350 as necessary, and makes other movements as necessary, to transfer the parcels 120 from the conveyor 400 to the truck 200. In some embodiments, the robotic system 300 includes a vision system to facilitate the picking up and placing down of the parcels 120 by the end effector 330.

As described further below, a control system sends control commands to the robotic system 300, and receives feedback from the robotic system 300, to accomplish the dense packing of the parcels 120 from the conveyor 400 in the truck 200 (e.g., utilizing unique optimization and patterning software). Once one level of parcels 120 is packed in the truck 200, the robotic system 300 will proceed to fill the second level, then the third, etc. in sequence. Filling the cargo area of the truck 200 in this manner will prevent parcels 120 of different sizes from falling or "cascading." Freight carriers would be filled from bottom-to-top, versus the typical technique of front-to-back when utilizing human labor.

In some embodiments, prior to beginning the process of loading the cargo area of the truck 200, the robotic system 300 performs one or more actions to become positionally oriented with respect to the cargo area of the truck 200. For example, in some embodiments the robotic system 300 uses one or more measurement lasers, vision system(s), a contact-based system, or the like, or combinations thereof to sense the locations of the floor, walls, and ceiling of the cargo area of the truck 200. In that manner, the control system for the robotic system 300 can ascertain the usable size/volume of the cargo area of the truck 200, and the relative position of the usable size/volume of the cargo area of the truck 200 in comparison to the robotic system 300. Thereafter, the control system can control the robotic system 300 to place parcels 120 in the usable size/volume of the cargo area of the truck 200, and subtract the volumes of the placed parcels 120 from the usable size/volume of the cargo area of the truck 200 to keep track of the filled and unfilled volume of the cargo area of the truck 200.

It should be understood that the systems and methods described herein can be used for any type of process involving the shipment of goods. For example, direct-to-customer shipments, store replenishment orders, customer pick-up-at-store orders, forward deployment of inventory shipments, inventory transfers, and the like can be advantageously processed and fulfilled using the systems and methods described herein.

In some embodiments, the systems and methods described herein can additionally or alternatively utilize other factors or priorities (besides the density of the packing of the parcels 120) to determine how the parcels 120 should be positioned within the cargo area of the truck 200. For example, in some embodiments parcels 120 for store replenishment can be positioned in the cargo area of the truck 200 in accordance with a desired sequence for the store replenishment process. That is, the parcels 120 can be loaded so that the sequence of unloading the parcels 120 correlates with an optimized sequence for store-shelf or store-aisle replenishment. Moreover, in some embodiments other logical factors and priorities could be used to determine how the parcels 120 should be positioned within the cargo area of the truck 200. Such factors and priorities can include, but are not limited to, package strength, cargo durability, fragility, risk of leakage, value of cargo, and temperature zones.

Figure 5:
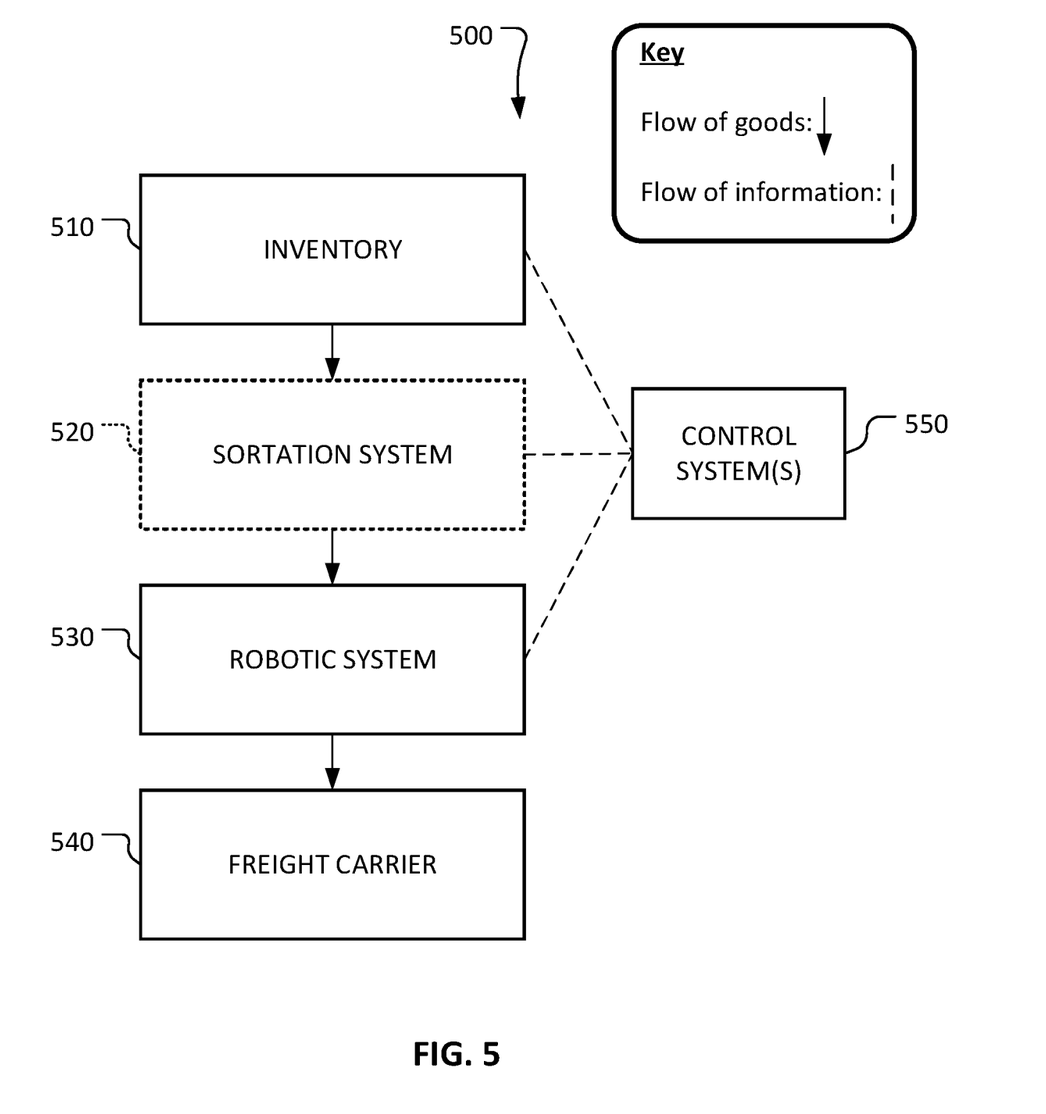
FIG. 5 is a schematic diagram of an example system and method described herein in accordance with some embodiments.

Referring also to FIG. 5, a schematic diagram 500 can be used to depict the flow of goods and the flow of information involved in the systems and methods described herein. As represented on the left of the diagram 500 (by the solid lines with arrowheads), the goods (e.g., the example parcels 120) flow from the inventory 510 of a facility (e.g., warehouse, distribution center, manufacturing facility, cross-docking facility, flow center, store, etc.), through a sortation system 520 (optionally, as indicated by the broken-line box), to the robotic system 530 (e.g., robotic system 300 or other embodiments described herein), and into the freight carrier (e.g., the cargo area of the truck 200 or other freight carriers described herein). As described above, in some embodiments the goods are presented to the robotic system on a conveyor (e.g., the example conveyor 400).

As denoted on the right of the diagram 500 (by the dashed lines), the flow of information transfers from and/or to one or more control systems 550 that can be in communication at least with the inventory 510, the optional sortation system 520, and the robotic system 530. It should be understood that in this context the one or more control systems 550 broadly encompasses various types of control systems. In some examples, the control system(s) 550 can include one or more systems that may be part of and/or may comprise or may be in communication with systems such as, but not limited to, an enterprise resource planning (ERP) system, a materials management system, an inventory management system, a warehouse management system, one or more automation control systems (for the robotic system 530, the optional sortation system 520, etc.), programmable logic controllers, motion controllers, and the like. Accordingly, the control system(s) 550 can include hardware, software, user-interfaces, and so on. For example, the control system(s) 550 may include one or more computer systems, data storage devices, wired and/or wireless networks, control system software (e.g., programs, modules, drivers, etc.), user interfaces, scanners, communication modules, interfaces for control communications with robots (e.g., the robotic system 530, mobile robots, etc.), and the like. Such scanners may include hand-held, mobile, and/or fixed readers that can scan, receive, or otherwise detect marks or tags (e.g., bar codes, radio frequency identification (RFID) tags, etc.) on individual sellable items or collections of sellable items (e.g., parcels 120, cases, totes, etc.) and communicate with a control station or stations of the control system(s) 550. The scanners may also be able to scan, receive, or otherwise detect the marks or tags (e.g., bar codes, RFID tags, etc.) attached to or integrated with conveyance parcels, packages, and receptacles such as totes and boxes.

In some embodiments of the systems and methods described herein, the size dimensions (e.g., length, width, height, diameter, etc. of the parcels 120) are used by the control system(s) 550 when determining where in the cargo area of the truck 200 to position each of the parcels 120 to achieve a densely packed arrangement of the parcels 120. In some embodiments, the size dimensions of the parcels 120 are known by the control system(s) 550 while the parcels 120 are in the inventory 510 (and used thereafter during the process of loading the parcels 120 into the freight carrier). In particular embodiments, the size dimensions of the parcels 120 are determined (e.g., measured or received) as a part of the overall process for loading the parcels 120 into the freight carrier. For example, in some embodiments parcels 120 can be measured while on the conveyor 400 (or as part of the induction process of the parcels 120 onto the conveyor 400). The measurements (which can be obtained automatically, semi-automatically, and/or manually) can be communicated to the control system(s) 550 so that the measurements can be taken into account as the control system(s) 550 determines where in the cargo area of the truck 200 to position each of the parcels 120 to achieve a densely packed arrangement of the parcels 120. In some embodiments, the parcels 120 include labeling that indicates the size dimensions of the parcels 120. In such as case, the measurements (as indicated by the labeling) can be automatically, semi-automatically, and/or manually ascertained and communicated to the control system(s) 550 so that the measurements can be taken into account as the control system(s) 550 determines where in the cargo area of the truck 200 to position each of the parcels 120 to achieve a densely packed arrangement of the parcels 120.

Still referring to FIGS. 4 and 5, in some example embodiments the control system(s) 550 can determine where in the cargo area of the truck 200 to position individual parcels 120 on a one-at-a-time basis. That is, as a particular parcel 120 is ready to be loaded into the truck 200, the control system(s) 550 can then make a determination of where the particular parcel 120 should be placed, based on: (i) the size dimensions of the particular parcel 120 and (ii) the configuration of the open space(s) in the cargo area of the truck 200 as known by the control system(s) 550. Once the determination for where to best position the particular parcel 120 is made by the control system(s) 550, then the control system(s) 550 can send control commands to the robotic system 300/530 to physically place the particular parcel 120 in the determined location within the cargo area of the truck 200. After that, the control system(s) 550 will remember that the previously open space is now filled (to the extent of the size dimensions of the particular parcel 120), such that the configuration of the open space(s) in the cargo area of the truck 200 (as known by the control system(s) 550) is decreased as each parcel 120 is loaded. Using that example one-at-a-time basis, the control system(s) 550 and robotic system 300/530 can load the parcels 120 in the cargo area of the truck 200 to achieve a densely packed arrangement of the parcels 120. It should be remembered that the control system(s) 550 can, in some embodiments, use alternative or additional criteria (besides the size dimensions of the parcels 120) to determine where to locate the parcels 120 in the truck 200. For example, as described elsewhere herein, in some embodiments criteria related to loading the truck 200 such that the sequencing of the unloading of parcels 120 facilitates efficient store replenishment can be used by the control system(s) 550.

In some embodiments, the sortation system 520 can be used in conjunction with the above-described one-at-a-time basis for determining where in the truck 200 to load each of the parcels 120 to achieve a densely packed arrangement of the parcels 120. For example, in some embodiments the sortation system 520 can be used to consolidate parcels 120 into groupings of similar size, so that the one-at-a-time basis for determining where in the truck 200 to load each of the parcels 120 is enhanced as compared to loading a mixed sequence of randomly sized parcels 120.

Still referring to FIGS. 4 and 5, in some example embodiments the control system(s) 550 can determine where in the cargo area of the truck 200 to position individual parcels 120 on a batch-processing basis. That is, a batch of parcels 120 can be presented to the robotic system 300/530, and the control system(s) 550 can make a determination of where each of the parcels 120 in the batch should be placed, based on: (i) the size dimensions of each of the parcels 120 in the batch and (ii) the configuration of the open space(s) in the cargo area of the truck 200 as known by the control system(s) 550. This batch-processing methodology may in some cases result in more densely packed loads of parcels 120 (in comparison to the one-at-a-time basis) because the control system(s) 550 can optimize the packing density on the basis of the multiple parcels 120 in the batch.

Once the determination for where to best position the particular parcel 120 is made by the control system(s) 550, then the control system(s) 550 can send control commands to the robotic system 300/530 to physically place the each of the parcels 120 in the batch in the determined locations within the cargo area of the truck 200. After that, the control system(s) 550 will remember that the previously open spaces are now filled (to the extent of the size dimensions of the parcels 120), such that the configuration of the open space(s) in the cargo area of the truck 200 (as known by the control system(s) 550) is decreased as each parcel 120 is loaded. Using such a batch-processing basis, the control system(s) 550 and robotic system 300/530 can load the parcels 120 in the cargo area of the truck 200 to achieve a densely packed arrangement of the parcels 120. It should be remembered that the control system(s) 550 can, in some embodiments, use alternative or additional criteria (besides the size dimensions of the parcels 120) to determine where to locate the parcels 120 in the truck 200. For example, as described elsewhere herein, in some embodiments criteria related to loading the truck 200 such that the sequencing of the unloading of parcels 120 facilitates efficient store replenishment can be used by the control system(s) 550.

In some embodiments, the sortation system 520 can be used in conjunction with the above-described batch-process basis for determining where in the truck 200 to load each of the parcels 120 to achieve a densely packed arrangement of the parcels 120. For example, in some embodiments the sortation system 520 can be used to consolidate parcels 120 into batches of similar size, so that the batch-processing basis for determining where in the truck 200 to load each of the parcels 120 is enhanced as compared to loading a mixed sequence of randomly sized parcels 120.

Still referring to FIGS. 4 and 5, in some example embodiments the control system(s) 550 can determine where in the cargo area of the truck 200 to position individual parcels 120 on an entire load basis. That is, the control system(s) 550, knowing in advance the intended full contents of the truck 200, can determine in advance an optimum packing arrangement of all of the parcels 120 that are to be loaded into the freight carrier 540 (e.g., the truck 200). In some such embodiments, the sortation system 520 can be used to sequence the parcels 120 such that the parcels 120 are presented to the robotic system 300/530 in a manner that facilitates the determined optimum packing arrangement of entirely all of the parcels 120 to be loaded into the truck 200. The sortation system 520 can, in some embodiments, sort the parcels 120 in the precise sequential order in which the robotic system 300/530 can optimally load the truck 200. In some embodiments using the entire load basis, the sortation system 520 can sort the parcels 120 to be loaded on the truck 200 in batches that can help the robotic system 300/530 facilitate the process of optimally loading the truck 200.

Additional Optional Features and Embodiments

Figure 6:
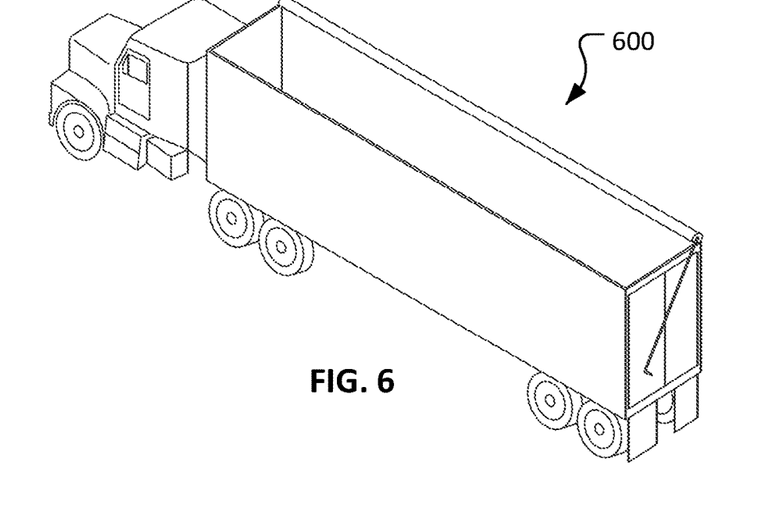
FIG. 6 is a perspective view of an example shipping truck with a cargo area that is configured to be accessible along the top of the semi-trailer.
Figure 7:
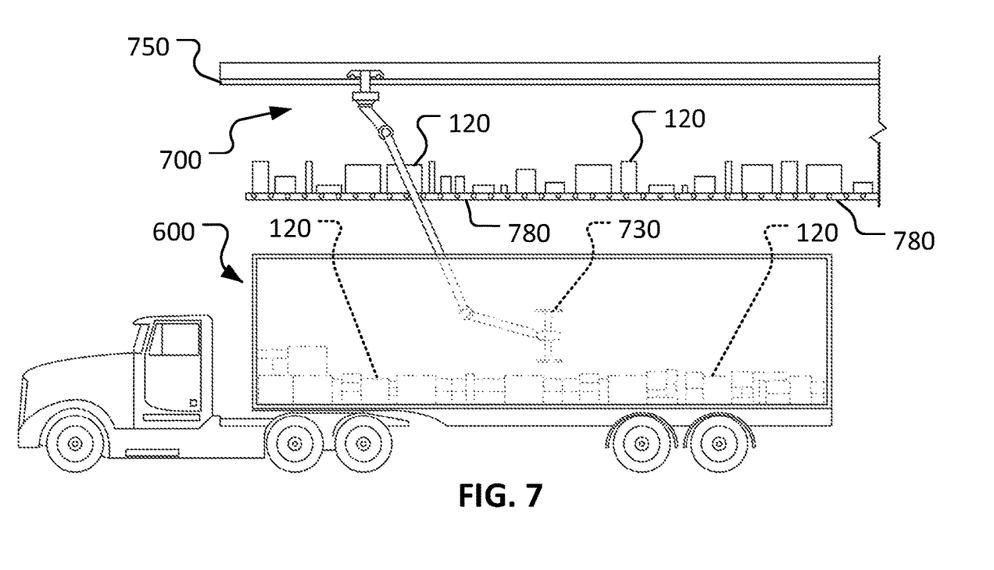
FIG. 7 is an elevation view of an example system for autonomously loading cargo into a top-accessible semi-trailer in accordance with some embodiments described herein.

Referring to FIGS. 6 and 7, while the systems and methods have been described above in the context of a side-accessible freight carrier (e.g., the truck 200 as shown in FIGS. 2 and 3), it should be understood that the systems and methods described herein can also be implemented in the context of a top-accessible freight carrier, such as the semi-trailer 600. That is, a robotic system 700 that includes a robotic actuator 710, an end effector 730, and overhead rail 750 can receive parcels 120 presented by an optional conveyor 780 and place the parcels 120 into the cargo area of the semi-trailer 600 in a densely packed manner, building upward from the floor of the semi-trailer 600. Any of the features, control schemes (e.g., the one-at-a-time basis, the batch-processing basis, and/or the entire load basis), and options that are described above in reference to the side loading arrangement are also applicable to this top loading arrangement.

It is also envisioned that the systems and methods described herein can be adapted to load a rear end accessible freight carrier (e.g., a conventional semi-trailer). In some such embodiments, the rail to which the robotic actuator is movable coupled can be cantilevered so that the robotic system projects into the interior space of the freight carrier. The rail can be telescopic in some cases. In some embodiments, the robotic actuator has one or more long-reaching telescopic arms that allow the robotic actuator to reach all the way to the front end of the freight carrier from the rear of the freight carrier.

While the embodiments depicted and described herein include a single robotic actuator that is movably engaged with a single rail, in some embodiments two or more robotic actuators can be movably engaged on the same rail. In some such embodiments, the two or more robotic actuators on the single rail can operate concurrently or semi-concurrently to thereby increase the rate at which parcels are loaded into the freight carrier.

While the embodiments depicted and described herein include a single rail and robotic actuator located along the open side or open top of a freight carrier, in some embodiments two rails (each having one or more robotic actuators) can be located along a single freight carrier. For example, a double-side-accessible freight carrier (e.g., the truck 200 of FIGS. 2 and 4 where both sides of the truck 200 are openable) can have a rail with one or more robotic actuators on each side of the freight carrier. In some such embodiments, the two rails that each include one or more robotic actuators can operate concurrently or semi-concurrently to thereby increase the rate at which parcels are loaded into the freight carrier.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse, a trackball, or a touchscreen, etc.) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, tactile input, eye movement tracking input, a brain-computer interface, gesture input, and the like, and combinations thereof).

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described herein should not be understood as requiring such separation in all embodiments, and it should be understood that the described program components and systems can generally be integrated together in a single product or packaged into multiple products.

What is claimed is:

1. A robotic system for loading a shipment of parcels into a freight carrier, the system comprising:
   the freight carrier comprising:
     a top;
     a front end;
     a back end; and
     an openable side extending between the front and back ends;
   a robotic actuator including one or more sensor devices;
   an end effector attached to the robotic actuator and adapted for releasably coupling with individual parcels of the shipment of parcels;
   a rail to which the robotic actuator is movably coupled, the rail extending parallel to the openable side of the freight carrier so that the robotic actuator is movable along the openable side of the freight carrier while loading the individual parcels into the freight carrier through the openable side of the freight carrier;
   a parcel sortation system; and
   a control system in communication with the robotic actuator and the parcel sortation system, the control system configured and operable to:
     control the parcel sortation system to consolidate the shipment of parcels into at least:
       (i) a first grouping of similarly sized parcels and (ii) a second grouping of similarly sized parcels, wherein the first and second groupings of similarly sized parcels differ from each other on a size basis of the individual parcels within the first and second groupings of similarly sized parcels;
     determine an open cargo space of the freight carrier using information from the one or more sensor devices;
     determine locations within the open cargo space of the freight carrier that each individual parcel of the first grouping of similarly sized parcels should be positioned based on: (i) size dimensions of the individual parcels of the first grouping of similarly sized parcels and (ii) the determined open cargo space of the freight carrier;
     send control commands to the robotic actuator to position each individual parcel of the first grouping of similarly sized parcels at the respective determined locations of each individual parcel of the first grouping of similarly sized parcels;
     determine locations within the open cargo space of the freight carrier that each individual parcel of the second grouping of similarly sized parcels should be positioned based on: (i) size dimensions of the individual parcels of the second grouping of similarly sized parcels and (ii) the determined open cargo space of the freight carrier;
     send control commands to the robotic actuator to position each individual parcel of the second grouping of similarly sized parcels at the respective determined locations of each individual parcel of the second grouping of similarly sized parcels; and
     create a first layer of the parcels on the floor of the freight carrier until the open cargo space on the floor of the freight carrier cannot accommodate another parcel of the shipment of parcels, and when the floor of the freight carrier cannot accommodate another parcel, create a second layer of the parcels directly on top of the first layer of parcels until the open cargo space directly on top of the first layer of parcels cannot accommodate another parcel of the shipment of parcels.

2. The system of claim 1, wherein the control system is configured and operable to determine an updated open cargo space of the freight carrier as each of the individual parcels is individually positioned in the open cargo space of the freight carrier.

3. The system of claim 1, further comprising a conveyor positioned along the rail and extending parallel to the rail, the conveyor configured to convey the first grouping of similarly sized parcels to the robotic actuator and the second grouping of similarly sized parcels, wherein the first and second groupings of similarly sized parcels are conveyed in two separate groups.

4. The system of claim 1, wherein the robotic actuator comprises a vision system, and wherein the end effector is oriented to couple with the individual parcels using the vision system.

5. The system of claim 1, wherein the robotic actuator is supported on and above the rail.

6. The system of claim 1, further comprising a second robotic actuator movably coupled to the rail.

7. The system of claim 1, further comprising a second rail and a second robotic actuator movably coupled to the second rail.

8. A method for robotically loading a shipment of parcels into a freight carrier, the method comprising:
   controlling a robotic system to obtain: (i) a physical orientation of the robotic system in relation to a cargo space of the freight carrier and (ii) an open cargo space of the freight carrier, wherein the freight carrier comprises:
a top;
a front end;
a back end; and
an openable side extending between the front and back ends;

receiving respective size dimensions of each individual parcel of the shipment of parcels to be loaded into the freight carrier;

controlling a parcel sortation system to consolidate the shipment of parcels into at least: (i) a first grouping of similarly sized parcels and (ii) a second grouping of similarly sized parcels, wherein the first and second groupings of similarly sized parcels differ from each other based on the respective size dimensions of the individual parcels within the first and second groupings of similarly sized parcels;

determining respective locations within the open cargo space of the freight carrier for each individual parcel of the first grouping of similarly sized parcels based on: (i) the respective size dimensions of each individual parcel of the first grouping of similarly sized parcels and (ii) the open cargo space of the freight carrier;

controlling the robotic system to travel along a rail that extends parallel to the openable side of the freight carrier and to physically position each individual parcel of the first grouping of similarly sized parcels through the openable side of the freight carrier and in the determined respective locations within the open cargo space of the freight carrier for each individual parcel of the first grouping of similarly sized parcels;

determining respective locations within the open cargo space of the freight carrier for each individual parcel of the second grouping of similarly sized parcels based on: (i) the respective size dimensions of each individual parcel of the second grouping of similarly sized parcels and (ii) the open cargo space of the freight carrier;

controlling the robotic system to travel along a rail that extends parallel to the openable side of the freight carrier and to physically position each individual parcel of the second grouping of similarly sized parcels through the openable side of the freight carrier and in the determined respective locations within the open cargo space of the freight carrier for each individual parcel of the second grouping of similarly sized parcels; and controlling the robotic system to:
create a first layer of the parcels on the floor of the freight carrier until the open cargo space on the floor of the freight carrier cannot accommodate another parcel of the shipment of parcels, and
when the floor of the freight carrier cannot accommodate another parcel, create a second layer of the parcels directly on top of the first layer of parcels until the open cargo space directly on top of the first layer of parcels cannot accommodate another parcel of the shipment of parcels,
wherein the open cargo space is determined after each individual parcel is physically positioned within the freight carrier.

9. The method of claim 8, wherein a vision system is used to assist the robotic system to pick up each of the parcels.

10. The method of claim 8, wherein the step of determining respective positions within the freight carrier for each of the individual parcels is performed on a one parcel at a time basis.

11. The method of claim 8, wherein the step of determining respective positions within the freight carrier for each of the individual parcels is performed on batch of parcels basis for a first batch that consists of the first grouping of similarly sized parcels and for a second batch that consists of the second grouping of similarly sized parcels.

12. The method of claim 8, further comprising a second robotic actuator movably coupled to the rail.

13. The method of claim 8, further comprising a second rail and a second robotic actuator movably coupled to the second rail.

14. The method of claim 8, further comprising a conveyor positioned along the rail, the conveyor configured to convey the parcels to the robotic system.

* * * * *